United States Patent [19]

Kawabata

[11] 4,297,984

[45] Nov. 3, 1981

[54] AIR-FUEL MIXTURE CONTROL VALVE ASSEMBLY

[75] Inventor: Yasuhiro Kawabata, Anjo, Japan

[73] Assignee: Aisin Seiki Kabushiki Kaisha, Kariya, Japan

[21] Appl. No.: 82,529

[22] Filed: Oct. 9, 1979

[30] Foreign Application Priority Data

Oct. 9, 1978 [JP] Japan ............................ 53/139017[U]

[51] Int. Cl.³ .......................................... F02M 23/04
[52] U.S. Cl. .................................... 123/587; 123/327
[58] Field of Search ....................... 123/585, 587, 327; 251/61.3, 63.4, 61.2; 137/DIG. 8

[56] References Cited

U.S. PATENT DOCUMENTS

| 1,373,599 | 4/1921 | Clark | 251/63.4 |
| 1,921,551 | 8/1933 | Temple | 251/61.3 |
| 3,364,909 | 1/1968 | Mick | 123/587 |
| 3,866,588 | 2/1975 | Nakada | 123/587 |
| 3,955,364 | 5/1976 | Lewis | 123/327 |
| 4,194,477 | 3/1980 | Sugiyama | 123/587 |
| 4,196,709 | 4/1980 | Toryu | 123/587 |

FOREIGN PATENT DOCUMENTS 113589 3/1945 Sweden .............................. 251/63.4

Primary Examiner—Ronald H. Lazarus
Attorney, Agent, or Firm—Finnegan, Henderson, Farabow, Garrett & Dunner

[57] ABSTRACT

An air-fuel mixture control valve assembly for automotive vehicles comprises a valve member which is capable of controlling the opening-closing operation of an air admission passage connected to an intake manifold and a one-way disc valve which is disposed in the air admission passage to prevent the possible adverse current of a high pressure and high temperature fluid within the valve assembly, whereby the air is supplied to the intake manifold upon the sudden deceleration of the vehicle to thereby prevent possible generation of various pollutants.

5 Claims, 2 Drawing Figures

AIR-FUEL MIXTURE CONTROL VALVE ASSEMBLY

BACKGROUND OF THE INVENTION

This invention relates to an air-fuel mixture control valve assembly for automotive vehicles and more particularly, to a valve assembly for the regulation of the air-fuel mixture delivered to an internal combustion engine of automotive vehicles.

It has been required, by imposed regulations for automotive vehicles, to prevent misfiring and accompanying increase in the amount of unburnt, harmful constituents present in exhaust gases. More specifically, the regulations specify the maximum permissible amounts of various pollutants including carbon monoxide, hydrocarbons and nitrogen oxides which may be emitted by the engine exhaust gases into the atmosphere.

One of the solutions for the emission control problem is to employ an air-fuel mixture control valve assembly which introduces atmospheric air into the intake manifold upon a predetermined condition of driving. That is, when sudden deceleration is applied to rapidly increase the negative pressure in the intake manifold, the unburnt fuel adherent on the inside wall of the intake manifold may be introduced into the carburetor to cause a temporary richness of the mixture which, in turn, results in the generation of carbon monoxide and hydrocarbons.

The mixture control valve assembly has been proposed to avoid such temporary mixture richness by air admission into the intake manifold. The valve assembly comprises a valve member which will control the opening-closing of the air admission passage in response to the driving conditions and a one-way ball valve disposed in the air admission passage to thereby prevent possible adverse current of a high pressure and high temperature fluid due to backfiring which may be caused by, for example, wrong spark timing.

The one-way ball valve has, however, disadvantages in that the ball has to be seated due to the adverse current pressure of fluid against the weight of the ball thereby resulting in inferior response of movement thereof and insufficient prevention of the adverse current.

SUMMARY OF THE INVENTION

It is, therefore, one of the objects of the present invention to provide an air-fuel mixture control valve assembly which can overcome the conventional drawbacks as mentioned above.

It is another object of the present invention to provide an air-fuel mixture control valve assembly which will ensure the prevention of the adverse current of a high pressure and high temperature fluid by quick response due to the employment of a disc plate valve in place of the ball valve.

It is a further object of the present invention to provide an air-fuel mixture control valve assembly which is simple in construction and reliable in operation.

Other objects, features and advantages of the present invention will be apparent from a reading of this description, which proceeds with reference to the accompanying drawings.

DETAILED DESCRIPTION OF THE PREFERRED EMBODIMENT

Figure 1:
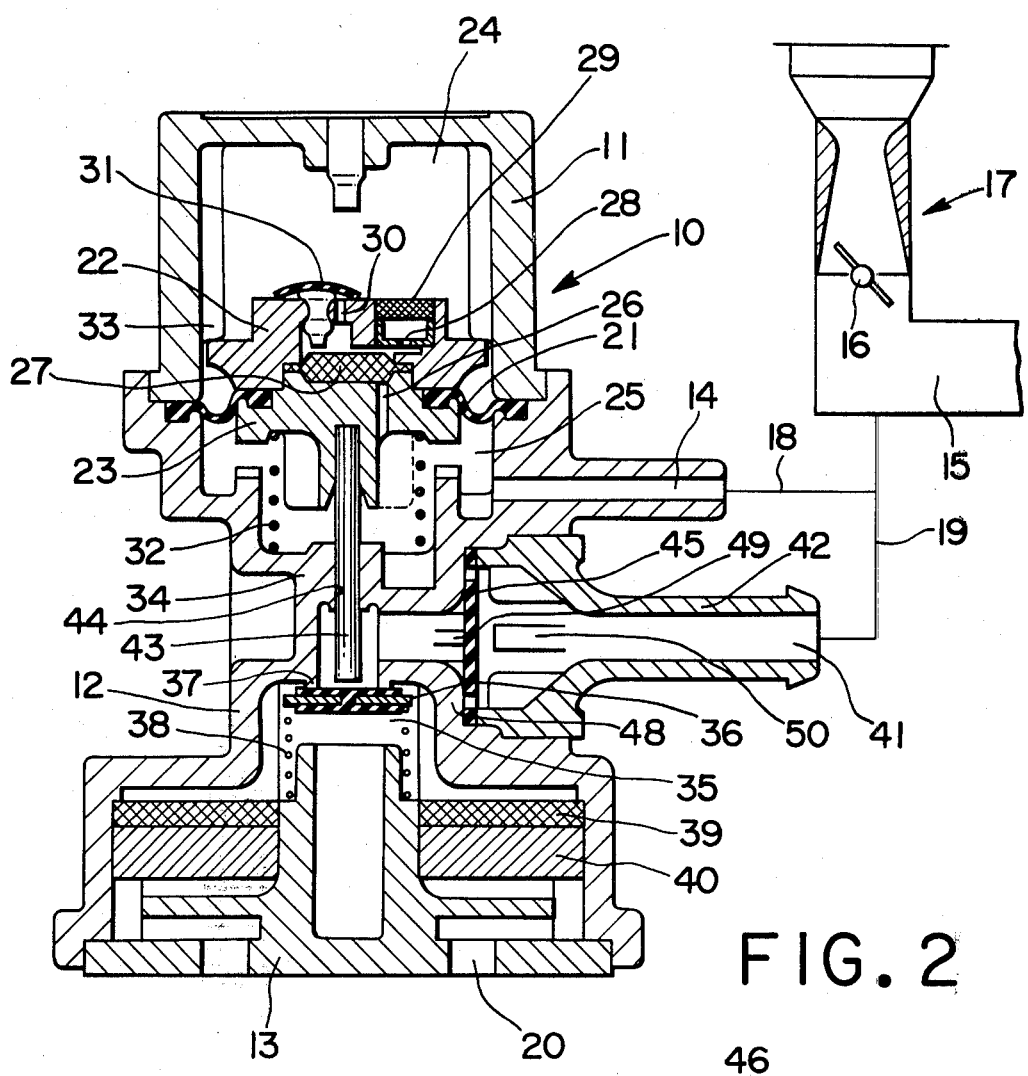
FIG. 1 is a cross-sectional view of one embodiment of an air-fuel mixture control valve assembly according to the present invention in association with an intake manifold.

Referring now to the above-mentioned Figures, it can be seen that an air-fuel mixture control valve assembly 10 comprises a first body 11, a second body 12 fixed to the first body 11, and a third body 13 fixed to the second body 12. The second body 12 is provided with a vacuum inlet port 14 connected to an intake manifold 15 downstream of a butterfly valve 16 of a carburetor 17 via pipes 18 and 19. The third body 13 is provided with an atmospheric air port 20 communicating with atmospheric air.

A diaphragm 21 is sealingly inserted, at the outer periphery thereof, between the first and second bodies 11 and 12, while at the same time, the diaphragm 21 is disposed at the inner periphery thereof between movable members 22 and 23, thereby constituting a first chamber 24 and a second chamber 25 which are distinct from each other. The second chamber 25 is normally in hydraulic communication with the inlet port 14 as well as with the first chamber 24 through an axial passage 26 provided in the movable member 23, a filter 27 fixedly mounted thereon, an orifice member 28, a filter 29 fixedly mounted on the movable member 22 and a passage 30 provided in the movable member 22 which is controlled by a one-way umbrella valve 31 secured to the movable member 22. Within the second chamber 25 is disposed a compression coil spring 32 which biases the movable members 22 and 23 and diaphragm 21 upwardly to thereby bring the movable member 22 into abutment with a stopper shoulder 33 provided on the first body 11.

The second body 12 includes, at an intermediate portion thereof, a neck 34 and constitutes therein a third chamber 35 in cooperation with a valve member 36 which may be seated on a projection 37 of the second body 12 due to the exerting force of a spring 38. The third chamber 35 is normally in atmospheric communication with the port 20 through two air filters 39 and 40 and may be in communication with an outlet port 41 of a nose member 42 fixed to the second body 12 in response to movement of the valve member 36, the outlet port 41 being in communication with the intake manifold 15 via pipe 19.

The movable member 23 includes an axial rod 43 rigidly carried thereon at one end thereof and passing through a hole 44 on the neck 34 of the second body 12 to confront the valve member 36 at the other end thereof. Thus, the downward movement of the rod 43 causes the valve member 36 to be released from the projection or seat 37 thereby permitting atmospheric communication between the third chamber 35 and the outlet port 41.

Figure 2:
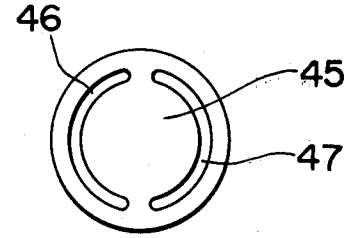
FIG. 2 is a plan view of a disc valve employed in the valve assembly of FIG. 1.

Between the second body 12 and the nose member 42, a one-way check valve plate 45 made of a resilient or flexible material such as fluorine rubber, stainless steel or other heat-resistant materials is securely mounted to prevent the adverse current of fluid from flowing into the valve assembly 10. The check valve plate 45 is formed in a disc shape and provided with a pair of arc-shaped holes 46 and 47 adjacent to the outer periphery thereof at which the disc 45 is fixed between the second body 12 and the nose member 42, as seen in FIG. 2. The disc 45 has a flat configuration as illustrated in FIG. 1 and when the pressure at the outlet port 41 becomes higher than the pressure at the third chamber 35, the holes 46 and 47 are closed due to engagement with an annular shoulder 48 of the second body 12. The reference numerals 49 and 50 indicate ribs provided on the second body 12 and on the nose member 42, respectively, to limit the deflection of the disc 45.

In operation, each constituent element of the mixture control valve assembly 10 is in the position as illustrated in FIG. 1 under normal driving conditions, thereby keeping the valve member 36 seated against the projection 37 and interrupting the admission of air to the intake manifold 15.

In the event that the vacuum pressure in the intake manifold 15 suddenly increases due to, for instance, rapid deceleration, the movable members 22 and 23 move down in unison with the diaphragm 21 against the exerting force of spring 32 due to negative pressure admitted into the second chamber 25. Thus, the valve member 36 is released from the seat 37 by the rod 43 with the result that the disc 45 is deflected toward the outlet port 41 to engage the rib 50 due to the pressure difference between the third or atmospheric chamber 35 and the outlet port 41. As a consequence, atmospheric air is supplied to the intake manifold 15 through the arc-shaped holes 46 and 47 on the disc 45 to thereby avoid the possible generation of carbon monoxide and hydrocarbons due to temporary richness of the mixture.

The negative pressure in the second chamber 25 is admitted into the first chamber 24 via the orifice 28 after a predetermined time period to diminish the pressure difference between the first and second chambers 24 and 25 in order to release the other end of the rod 43 from the valve member 36 by the upward movement of the movable members 22 and 23 due to the urging of the spring 32. Therefore, the valve member 36 is brought into sealing engagement with the projection 37 in order to interrupt the admission of atmospheric air into the intake manifold 15.

When the vehicle is in the normal driving condition, the negative pressure in the intake manifold 15 is decreased to open the umbrella valve 31 so that the negative pressure in the second chamber 25 is rapidly decreased to maintain the movable members 22 and 23 as well as the diaphragm 21 at the position shown in FIG. 1.

While the form of the invention now preferred has been illustrated and described, it is to be understood that other forms and embodiments can be utilized and still come within the scope of the appended claims.

What is claimed is:

1. An air-fuel mixture control valve assembly for automotive vehicles in association with an intake manifold, comprising:
    a body provided with an inlet port and an outlet port each connected to said intake manifold, and an atmospheric air port normally supplied with atmospheric air,
    diaphragm means disposed in said body and movable in accordance with negative pressure in said intake manifold admitted through said inlet port,
    a valve member interposed between said atmospheric air port and said outlet port to interrupt communication between said atmospheric air port and said outlet port when the negative pressure in said intake manifold is below a predetermined value and permitting said communication when said negative pressure increases above a predetermined value due to movement of said diaphragm means, and
    a disc valve interposed between said valve member and said outlet port to permit only an air flow from said atmospheric air port to said outlet port when said valve member is open, said disc valve member being deflectable only toward said outlet port when said valve member is opened and said body being provided with a pair of ribs disposed at each side of said disc valve, one of said ribs being in abutment with said disc valve when said valve member is closed and the other of said ribs being in abutment therewith when said valve member is opened to limit the deflection of said disc valve.

2. An air-fuel mixture control valve assembly as set forth in claim 1, wherein said disc valve is provided with a pair of arc-shaped holes which are closed by an annular shoulder of said body when said valve member is closed and are opened when said valve member is opened.

3. An air-fuel mixture control valve assembly as set forth in claim 1, wherein said disc valve is made of resilient material having heat-resistant properties.

4. An air-fuel mixture control valve assembly as set forth in claim 1, wherein said diaphragm means includes a diaphragm for dividing the interior of said body into two chambers, each being respectively connected through an orifice.

5. An air-fuel mixture control valve assembly as set forth in claim 6, wherein said diaphragm means includes a rod movable in unison with said diaphragm and engageable with said valve member..

* * * * *